Figure 1:
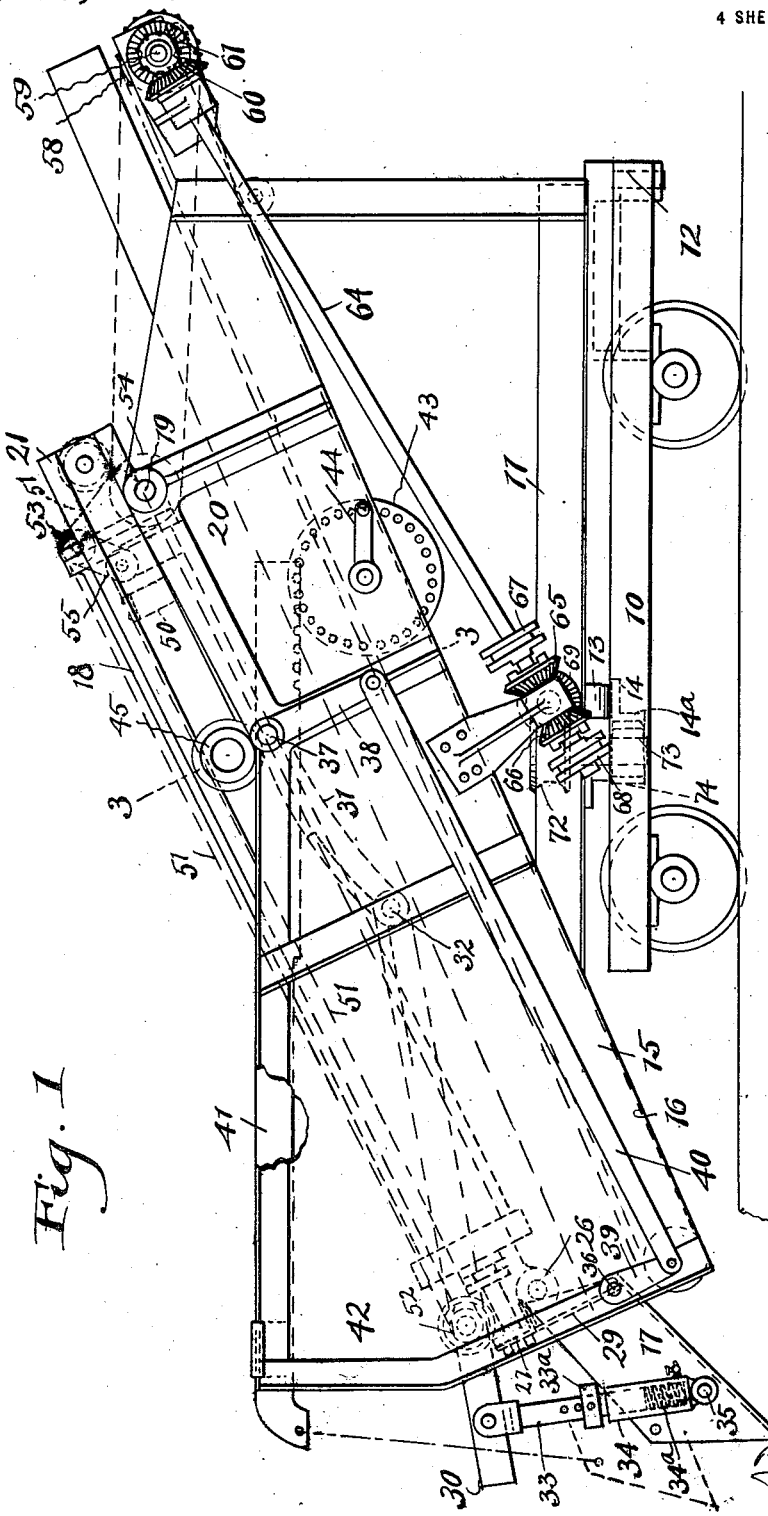

F. BILLINGS AND R. P. GREENLEAF.
LOADING MACHINE.
APPLICATION FILED APR. 25, 1918.

1,377,303. Patented May 10, 1921.
4 SHEETS—SHEET 1.

F. BILLINGS AND R. P. GREENLEAF.
LOADING MACHINE.
APPLICATION FILED APR. 25, 1918.
1,377,303.
Patented May 10, 1921.
4 SHEETS—SHEET 2.
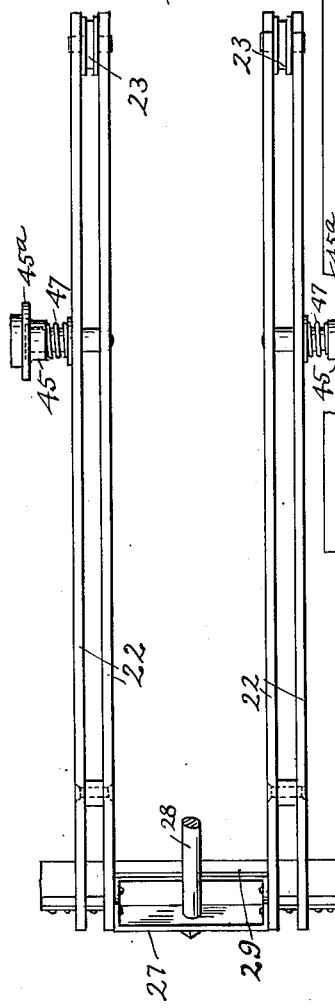
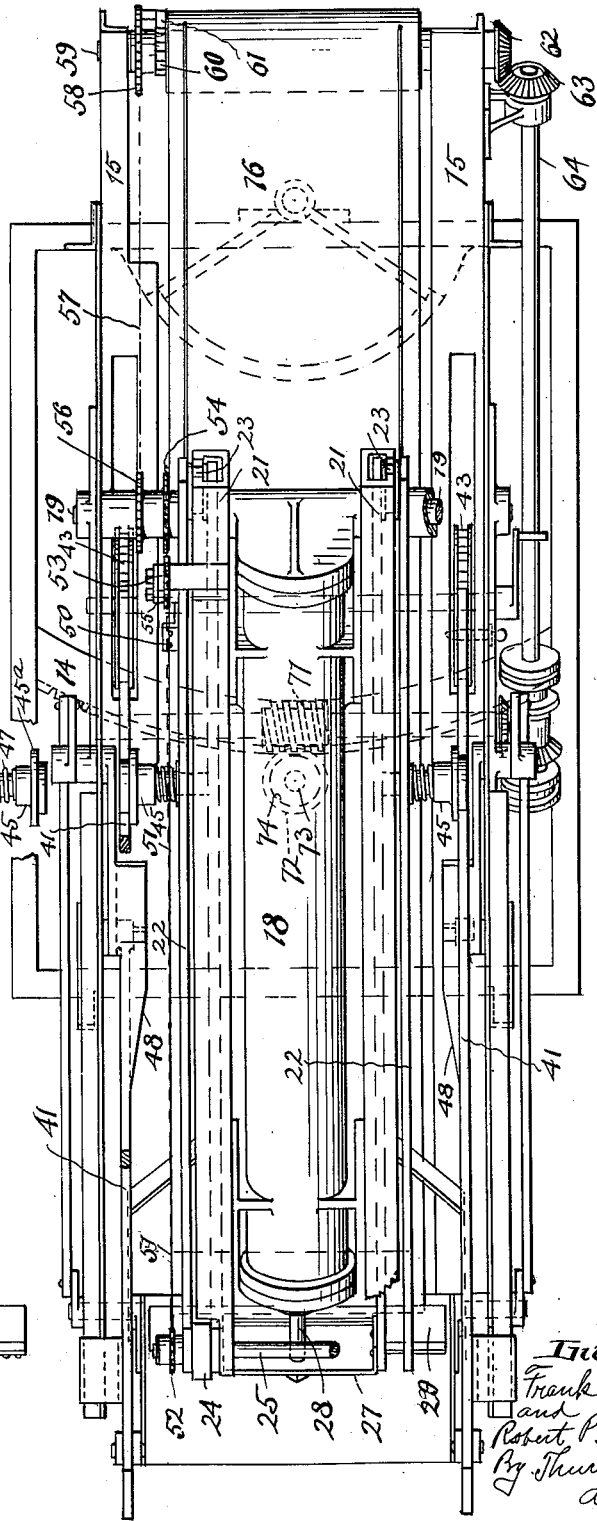

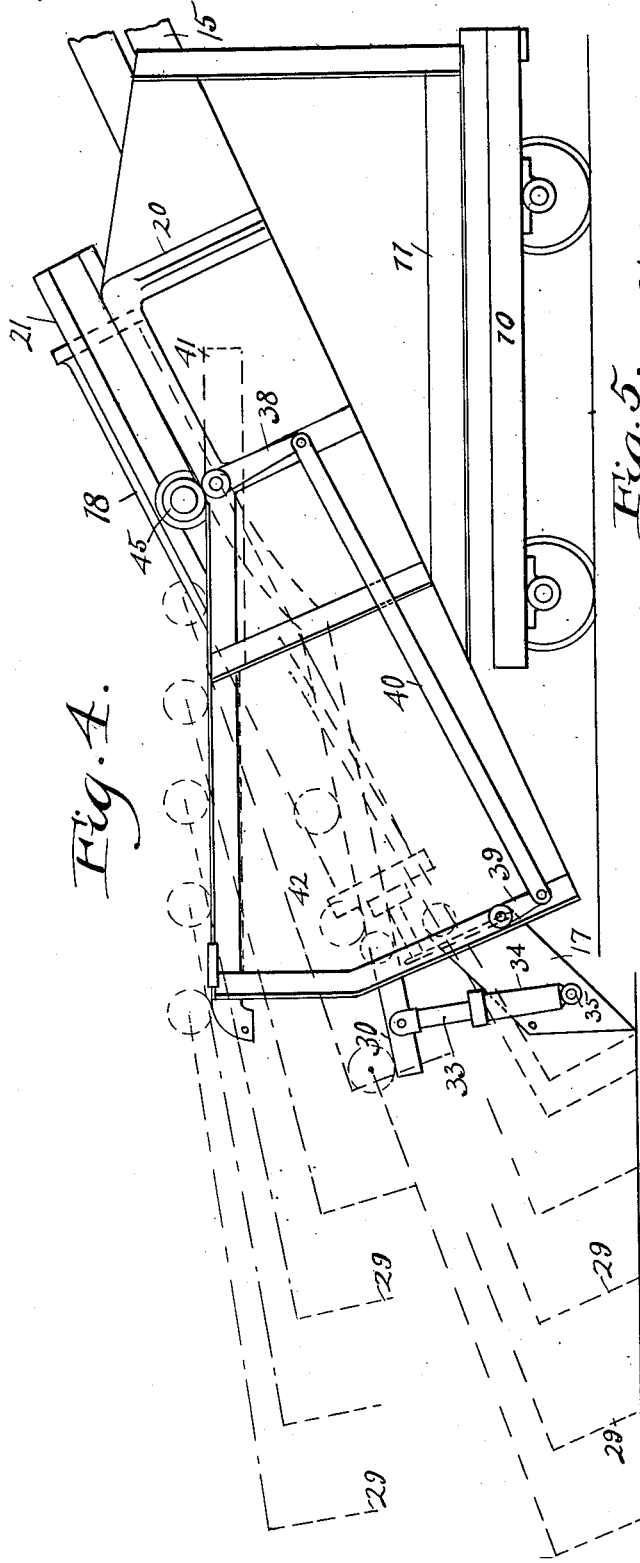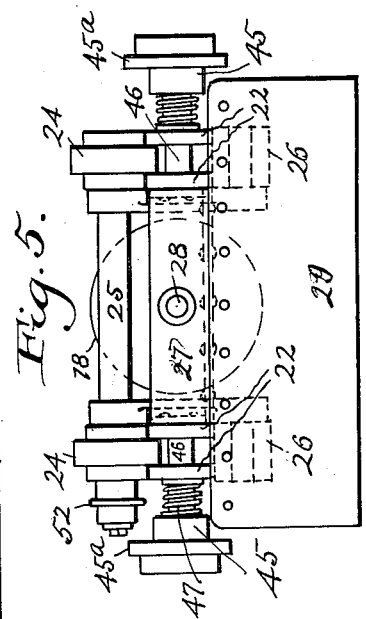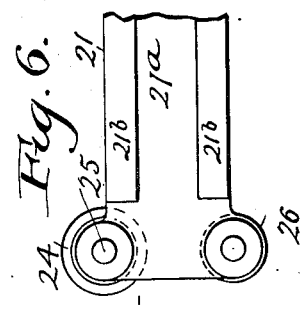

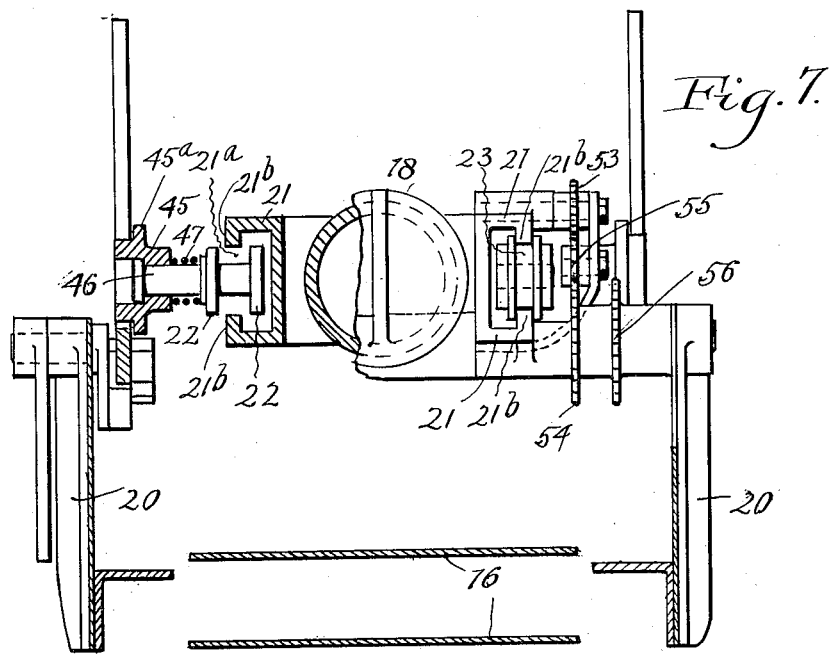
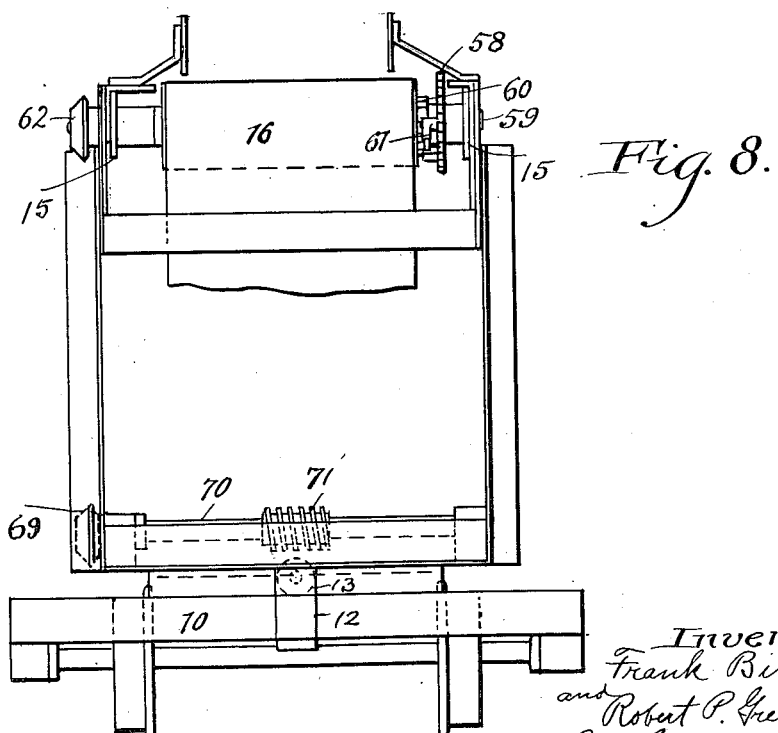

UNITED STATES PATENT OFFICE.

FRANK BILLINGS AND ROBERT P. GREENLEAF, OF CLEVELAND, OHIO; SAID GREENLEAF ASSIGNOR TO SAID BILLINGS.

LOADING-MACHINE.

1,377,303.     Specification of Letters Patent.     Patented May 10, 1921.

Application filed April 25, 1918. Serial No. 230,652.

*To all whom it may concern:*

Be it known that we, FRANK BILLINGS and ROBERT P. GREENLEAF, citizens of the United States, and residents of Cleveland, in the county of Cuyahoga and State of Ohio, have invented a certain new and useful Improvement in Loading-Machines, of which the following is a full, clear, and exact description.

This invention relates to a loading machine adapted particularly for use in mines, and has for its chief object the provision of a machine which, as compared with prior machines, is simple in construction, inexpensive, and easy to operate.

More particularly, the invention aims to provide a machine of the hoe type having a single motor for reciprocating the hoe, and to provide means whereby the hoe is guided both on its inward and outward stroke in such a manner that on its outward stroke it will move through an elevated path or plane, and while being retracted will move through a relatively low path or plane with the edge of the hoe traveling the desired distance from the ground, and from an apron up along which the material is scraped.

Still further, the invention aims to provide means whereby with the single motor above referred to, which motor is preferably of the reciprocating type, the endless conveyer will be moved intermittently at a sufficient rate to carry upwardly and rearwardly to the discharge point the material scraped onto it by the hoe.

A still further object is to provide means whereby with this same motor a superstructure, *i. e.,* the digging and conveying mechanism, will be moved intermittently with reference to the supporting frame or structure in a lateral direction as the loading of material progresses.

The above and other objects are accomplished by our invention, which may be briefly summarized as consisting in certain novel details of construction and combinations and arrangements of parts which shall be described in the specification and set forth in the appended claims.

In the accompanying sheets of drawings, wherein we have shown one embodiment of our invention, Figure 1 is a side view of the machine; Fig. 2 is a top plan view of the same; Fig. 3 is a detached plan view of the reciprocating ram and hoe; Fig. 4 is a diagrammatic view showing different positions of the hoe as it is moved through its cycle of movement; Fig. 5 is a front end view of the hoe and of the associated parts; Fig. 6 is a side view of the front end of the housing showing a portion of the ram and the hoe; Fig. 7 is a view partly in end elevation looking toward the rear end of the housing and partly in transverse section substantially along the line 3—3 of Fig. 1; and Fig. 8 is a rear view of the machine omitting some of the parts.

Referring now to the drawings, 10 represents a wheeled truck frame designed to run on the track of a mine. Mounted to turn on the truck frame 10 is a superstructure having a base or lower portion 11, at the rear of which is a pivoting bolt 12 about which the superstructure turns or swings horizontally on the truck. The forward portion of the superstructure is supported on the truck by a roller 13 which engages an arc shaped track 14 whose center is the axis of the pivoting bolt 12. The superstructure is adapted to be turned laterally in a manner to be hereinafter described.

The superstructure includes also an inclined conveyer frame 15 carrying a conveyer in the form of an endless belt 16 and provided at the front with an apron 17 which inclines upwardly from the ground so that the material may be scraped rearwardly up this apron onto the conveyer.

All the movements are imparted to the various working parts of the machine by a single motor which is here shown as a reciprocating air or other fluid pressure motor including a long cylinder 18 which extends centrally with respect to the conveyer frame above the conveyer proper, the upper rear end of the cylinder being pivotally mounted to swing about a horizontal axis by means of a transverse shaft 19 mounted in bearings supported in standards 20 projecting upwardlly from the conveyer frame. With this horizontal pivoting shaft at the rear of the motor, the latter can rise and fall when the hoe is reciprocated, with the assistance of certain guides to be subsequently explained with which the motor actuated parts coöperate.

At each side of the motor cylinder, and either cast integral therewith or secured thereto, are a pair of housings 21 for a two-part ram or shank which carries the hoe. These housings are parallel and extend the full length of the cylinder 18 and preferably project slightly beyond the latter at each end. These housings are in the form of box-like hollow channels, each having in its outer face or side a slot 21ª which extends the full length of the housing, and having also upwardly and downwardly projecting flanges 21ᵇ.

Mounted to reciprocate in these housings is a two-part ram, each part composed of two parallel bars 22 which are suitably spaced apart at intervals and maintained in parallelism. Each of these ram members, slides or rolls lengthwise of the corresponding housing, one of the bars of each ram member traveling through the space on the interior of the housing member 21, and the other being on the exterior and along the outer side of the housing member with the spacing members between the bars projecting through the open slot 21ª. (See particularly Fig. 4.) At the rear ends of the two ram members are flanged rollers 23 which engage the upper and lower flanges 21ᵇ of the housing, these flanged rollers guiding or holding the rear ends of the ram members in proper positions with respect to the corresponding housing members. At the forward ends of the ram housings are mounted supporting and guiding rollers including two upper flanged rollers 24 which are engaged by the upper edges of the ram bars 22 and are mounted on a transverse shaft 25, and two lower rollers 26 which are engaged by the lower edges of the ram bars 22.

The front ends of the two pairs of bars 22 constituting the ram are connected together by a cross-plate 27 to which the plunger 28 of the reciprocating motor is directly connected as shown in Fig. 2. This cross member 27 has secured to it the material scraping hoe 29 which is slightly less in width than the inclined apron 17.

Thus it will be seen that with this construction when the motor is operated the hoe will be reciprocated, and will have a considerable range of movement equivalent substantially to the length of the motor cylinder 18.

In order that the hoe, hoe ram and housing may be swung vertically, when the hoe is actuated through the reciprocating motor 18 with the hoe traveling through an upper plane on its outward stroke, and through a predetermined lower plane on its inward stroke, we provide along the sides of the conveyer frame upper and lower guides and on the ram members coöperating rollers which travel along the guides and are automatically switched from the lower to the upper guides at substantially the end of each inward movement of the ram, and drop from the upper to the lower guides at substantially the end of the outward stroke.

These guides include a pair of lower guides which are supported at the sides of the conveyer frame and each composed of two bars 30 and 31. The bar 30 is preferably straight, and the bar 31 is preferably curved, the former determining the path of movement of the hoe in traveling over the ground during the retraction of the hoe, and the latter guiding and determining the path of movement of the hoe while the latter is scraping material up along the apron 17. That is to say, these guides 30 and 31 keep the hoe substantially parallel to, and a predetermined distance from the ground and from the surface of the apron during the retraction of the hoe and while the latter is scraping material up to the conveyer of the machine.

The two guide members 30 and 31 are pivotally connected together at 32, and the front end of the forward guide 30 is supported from the apron, and in this case is connected to the plunger 33 which coöperates with a dash pot cylinder 34 connected at 35 to the apron. It may be here stated that the lower rear corners of the apron are pivoted at 36 to the lower front part of the conveyer frame, and that the lower front edge of the apron is designed to rest on the ground and may swing to adapt itself to varying heights of the ground. As will be subsequently explained, when the position of the apron changes with reference to the frame of the machine, the position of the guides 30, 31 is automatically adjusted.

The rear ends of the guide members 30 are pivoted to the conveyer frame at 37. The pivoting studs 37 which are fixed to, or integral with the guides 31, have on the outside of the frame downwardly extending arms 38, and the pivoting studs 36 which pivotally connect the apron 17 to the frame, likewise are rigid with the apron, and these studs have downwardly extending arms 39 which are parallel to the arms 38 and are connected thereto by connecting rods 40. In consequence, as the position or inclination of the apron is varied, the positions of the guides 30 and 31, particularly the latter, will be adjusted so that the hoe will be properly guided with reference to the apron, regardless of its inclination.

As previously stated, the guides 30 and 31 which are located on both sides of the machine, guide the hoe during the retraction of the latter, or during its inward movement. Additionally we provide at each side of the machine an upper guide 41 which guides or controls the movement of the hoe during its outward stroke. Each of these guides 41 is, as here shown, substantially horizontal, and their forward ends are some distances above the forward portions of the lower front guides 30. As will be subsequently explained, guide rollers which are carried by the ram, on the outward stroke of the ram run over the upper guides 41 which at their forward ends are curved downward and then these rollers drop down to the lower guides 30. The point at which the guide rollers drop from the upper guides to the lower guides can be adjusted by adjusting horizontally the position of the upper guides 41. In order that this adjustment might be made readily, the forward portions of the guides 41 are slidably connected to the upper edges of upstanding plates 42 at the front part of the conveyer frame, and their rear ends rest upon the teeth of adjusting gears or wheels 43, each of which may be turned by a crank 44, the lower rear edges of the guides being notched to accomodate the teeth of adjusting wheels 43.

The guide rollers which travel along the guides as above briefly explained, are shown at 45, these guide rollers having flanges 45$^a$, and being mounted on horizontal studs 46 carried by the bars 22 of the ram members. These rollers are slidable-axially on the studs 46, and are pressed outward toward the outer ends of the studs by coil springs 47 which surround the studs between the rollers and the ram members.

It will be observed by reference to Figs. 1 and 2, that the rear portions of the lower guides 30 and the adjacent portions of the lower guides 31 are provided with inwardly projecting cam flanges 48 which are so disposed that they will be engaged by the radial flanges 45$^a$ of the rollers 45 when the latter are traveling rearwardly along the guides 30 and 31. These cams are so disposed that as the rollers are traveling rearwardly along the lower guides, they will be cammed inwardly, and just before the hoe reaches the inner end of its stroke, the rollers will ride off these flanges or cams 48, in which event they snap laterally outwardly due to the springs 47, but when this takes place the end faces of the rollers engage the inner side faces of the upper guides 41 and just before the completion of the rear stroke of the hoe and ram, the rollers snap up over the guides 41 so that upon the forward stroke of the ram the rollers will travel forwardly along the upper guides 41 and will then drop off the forward ends of the latter onto the lower guides, and will again be automatically transferred to the upper guides at the completion of the next inward stroke.

The motor will be reversed either by hand when the rollers 45 drop from the upper guides to the lower guides and when the hoe reaches the inner limit of its stroke, or means may be provided for causing the motor to be reversed automatically.

When the rollers 45 drop off the upper guides, the hoe will sink into the material to be scraped rearwardly, in which event the rollers may not at that time engage the lower guides, but if there is not sufficient material beneath the hoe to entirely break its fall, the rollers will drop on the lower guides, but the blow will be checked by the dash pots 33 and 40, these being air dash pots. Preferably the plungers 33 of the dash pots have adjustable stops 33$^a$ by which the downward movement of the guides 30 is limited when the weight of the reciprocating structure is supported on the guides 30, and the chambers 34 of the dash pots are preferably provided with coil springs 34$^a$ which elevate the plungers and guides 30 after the rollers 45 leave the lower guides and engage the upper guides.

It will be seen therefore from the mechanism so far described, that with the single reciprocating motor the hoe and hoe ram are not only reciprocated, but are caused to be swung vertically with the hoe traveling at a necessary height above the ground on the out stroke of the hoe, and traveling through a lower plane during the return stroke of the hoe. In other words, the construction is such that with this single reciprocating motor, the hoe will be given a long outward stroke and is then lowered into the material, and is then retracted so as to scrape the material in an effective manner onto the conveyer.

A further feature of our invention resides in the manner in which the endless conveyer is operated. Ordinarily in a machine of this kind the conveyer is operated continuously and independently of the movements of the hoe, but in accordance with the present invention the conveyer is operated intermittently and is given a predetermined movement on each stroke of the hoe in one direction, the motor 18 being utilized to furnish power for this purpose. This is accomplished in the following manner. The outer bar of one of the ram members is provided with a plate 50 (see Fig. 2,) and to this plate is attached the ends of a sprocket chain 51 which extends forwardly, to and around a sprocket wheel 52 mounted on the shaft 25 which is at the forward end of the two housing members 21. Then the chain passes rearwardly around a sprocket 53 which is near the upper rear end of the ram housing, then around a sprocket 54 mounted on the shaft 19 about which the motor 18 is pivoted, and then forwardly and upwardly around a sprocket 55, and then downwardly and forwardly to the plate 50. The course of the chain and the arrangement of the sprockets as well as the location of the plate 50 are shown in Figs. 1 and 2. With this arrangement, the sprocket 54 will be turned in one direction and then the other, and the chain will travel back and forth as the ram moves forwardly and rearwardly.

At the side of the sprocket 54 is a similar sprocket 56 which is rotated by the sprocket 54, and this sprocket 56 is connected by a chain 57 to a sprocket 58 loosely mounted on shaft 59 at the extreme upper rear end of the conveyer frame, this shaft carrying a roller about which the conveyer belt 16 travels. A ratchet connection is provided between the sprocket 58 and shaft 59 so that the shaft will be turned by the movement of the sprocket in one direction but not in the other, and this ratchet mechanism includes a ratchet disk 60 which is fixed to the shaft 59 and a pawl 61 which engages the teeth of the disk 60 and is carried by the sprocket 58. The parts are so arranged that on the inward stroke of the ram, i. e., the stroke that causes the hoe to scrape up material onto the conveyer, the conveyer is not moved; but on the outward stroke the conveyer is given a sufficient movement to carry the material which is scraped onto the conveyer during the previous rearward movement of the hoe, upwardly and away from the load which is next moved onto the conveyer by the succeeding rearward movement of the hoe.

With this construction the conveyer is moved rapidly enough to convey away from the apron the material as fast as it is brought up onto the conveyer by the hoe, one important advantage of this construction being that no power is wasted by useless traveling of the conveyer while the hoe is not being manipulated. Additionally, of course, there is an advantage also of simplicity in number of operating parts which require the attention of the operator.

It will be understood that the conveyer will discharge into a suitable mine car or other receiving element at the rear of the machine.

Not only is the conveyer moved intermittently by the same motor which reciprocates and also causes the hoe to be swung vertically, but the motor is utilized also in our present construction to move the superstructure laterally on the truck frame about the axis of movement of the superstructure, and this likewise is an intermittent movement which through suitable clutch devices controllable at will can be discontinued or imparted to the superstructure so as to move it in either direction. This is accomplished through the following mechanism, which, however, can be varied in a number of particulars. We provide at one end of the shaft 59, which as before stated, is at the upper rear end of the conveyer frame, a bevel gear 62 which engages a bevel gear 63 on the upper end of a shaft 64 extending downwardly and forwardly as shown particularly in Fig. 1. Near the lower end of this shaft are two bevel gears 65 and 66, either of which by clutches 67 and 68 may be clutched to the shaft 64. These gears engage a bevel gear 69 on a horizontal shaft 70 mounted on the base 11 of the superstructure and extending crosswise thereof. This shaft has at the center a worm 71 which meshes with a worm wheel 72 which is mounted on a short vertical shaft supported in the base of the superstructure just forwardly of the arc-shaped track 14, and this shaft 73 has at its lower end a gear 74 which meshes with rack teeth on the front face of a downturned flange 14$^a$ of the track 14.

When both clutches 67 and 68 are out, the superstructure will remain stationary on the truck, but when either clutch is in, intermittent movements of the shaft 59 will be transmitted through the described mechanism to the lower pinion 74 which engages the rack, and the entire superstructure will be turned horizontally about the axis of the pin or bolt 12, step by step, in one direction or the other, depending upon which bevel gear 65 or 66 is clutched to the shaft 64. It will be understood, of course, that by this mechanism the superstructure will be gradually turned so that the hoe will be constantly brought within reach of the material as the material is gradually loaded, the hoe thus being brought within reach of the material at the sides as well as at the front of the machine.

It is believed the operation will be understood without further detailed statement of the same, and it will be seen from the above description that by this invention we have obtained a machine which utilizes simply a single motor to impart all the movements to the hoe, conveyer and superstructure, and that a machine which is inexpensive and easy to operate is obtained.

We do not desire to be confined to the precise details shown and described, but aim in our claims to cover all modifications which do not involve a departure from the spirit and scope of our invention.

Having described our invention, we claim:

1. In a loading machine, a frame, mechanism for scraping material rearwardly toward the frame comprising a hoe mounted for reciprocating movements forwardly and rearwardly and for swinging movements vertically, guides by which the hoe is caused to be swung vertically when reciprocated and is constrained to move in an upper plane when moving outwardly and in a lower plane when moving inwardly, and means for adjusting the guide which controls the lower path of movement relative to the guide controlling the lower path of movement.

2. In a loading machine, a frame, mechanism for scraping material rearwardly toward the frame comprising a hoe mounted for reciprocating movements forwardly and rearwardly and for swinging movements vertically, guides by which the hoe is caused to be swung vertically when reciprocated and is constrained to move in an upper plane when moving outwardly and in a lower plane when moving inwardly, an apron up along which material is scraped by the hoe, and means for adjusting the inclination of the apron and the guide which controls the path of movement of the hoe when traveling inwardly without affecting the path of outward movement.

3. In a loading machine, a frame, mechanism for scraping material rearwardly toward the frame comprising a hoe mounted for reciprocating movements forwardly and rearwardly and for swinging movements vertically, guides by which the hoe is caused to be swung vertically when reciprocated and is constrained to move in an upper plane when moving outwardly and in a lower plane when moving inwardly, an apron up along which material is scraped by the hoe, and means connected to the apron and to the guides which control the lower path of movement of the hoe for adjusting the position of the apron and the position of said guide.

4. In a loading machine, a frame, a hoe mounted for reciprocating movements forwardly and rearwardly and for swinging movements vertically, guides by which the hoe is caused to be swung vertically when reciprocated and is constrained to move in an upper plane when moving outwardly and in a lower plane when moving inwardly, said guides including a roller movable with the hoe, and two normally fixed guide rails along which the roller travels, one guide rail being above the other, and the guides being so positioned that when the roller reaches the outer end of the upper guide it may drop onto the lower guide, and means for absorbing the shock incident to the roller dropping onto the lower guide.

5. In a loading machine, a frame, a conveyer for moving material lengthwise of the frame, a hoe, mechanism for reciprocating the hoe outwardly and inwardly, and mechanism for operating the conveyer intermittently in timed relationship to hoe movements, the conveyer being actuated during outward movements of the hoe, and caused to stand stationary during inward movements thereof.

6. In a loading machine, a frame, a conveyer for moving material lengthwise of the frame, a hoe, mechanism for actuating the hoe outwardly and inwardly, and mechanism intermediate the hoe actuating mechanism and the conveyer whereby the conveyer is moved during the outward strokes of the hoe only.

7. In a loading machine, a base, a superstructure mounted thereon to turn about a substantially vertical axis, reciprocating hoe mechanism for scraping material rearwardly toward the base, and means for actuating the hoe mechanism and for turning the superstructure about its axis so that the superstructure will be given a gradual turning movement in predetermined relationship with respect to the movement of the hoe mechanism.

8. In a loading machine, a frame, a conveyer for moving material lengthwise of the frame, a hoe, reciprocating mechanism for actuating the hoe, and means connecting said reciprocating mechanism with the conveyer to impart intermittent movements thereto in predetermined timed relationship with respect to the hoe movements.

9. In a loading machine, a frame, an endless conveyer for conveying material lengthwise of the frame, reciprocating hoe mechanism for scraping material rearwardly onto said conveyer, and means for causing said reciprocating hoe mechanism to intermittently move the conveyer in one direction in predetermined timed relationship with respect to the hoe movements.

10. In a loading machine, a frame, a conveyer for moving material lengthwise of the frame, reciprocating hoe mechanism movable forwardly and rearwardly for scraping material onto the conveyer, and mechanism connecting said reciprocating hoe mechanism to the conveyer for moving the same intermittently by the strokes of said mechanism in one direction.

11. In a loading machine, a base, a superstructure mounted thereon to turn about a substantially vertical axis, reciprocating hoe mechanism for scraping material rearwardly toward the base, and means whereby the power imparted to reciprocate said mechanism is caused to intermittently move the superstructure above its axis of movement so that the superstructure will be given a predetermined swinging movement of definite amount for each actuation of the hoe.

12. In a loading machine, a base, a superstructure mounted thereon to swing laterally and comprising a conveyer and hoe mechanism for scraping material onto said conveyer, means for actuating said hoe mechanism, and means whereby the movements of said hoe mechanism causes definite and predetermined movements to be imparted to the superstructure 13. In a loading machine, a base, a superstructure mounted thereon to swing laterally and comprising a conveyer, a hoe mounted for swinging movements vertically and for reciprocating movements forwardly and rearwardly, a motor for reciprocating the hoe, and means whereby the movement of the hoe in one direction causes said superstructure to be intermittently turned on the base.

14. In a loading machine, a base, a superstructure mounted thereon to swing laterally, and comprising a conveyer, a hoe, means for reciprocating the hoe, and means whereby the movements of the hoe in one direction cause said superstructure to be intermittently turned on the base and cause the conveyer to be intermittently moved in one direction.

In testimony whereof we hereunto affix our signatures.

FRANK BILLINGS.
ROBERT P. GREENLEAF.